P. MORRIS.
MACHINE FOR SAWING, DRILLING, GRINDING, &c.
APPLICATION FILED APR. 14, 1919.
1,337,147.
Patented Apr. 13, 1920.
3 SHEETS—SHEET 3.
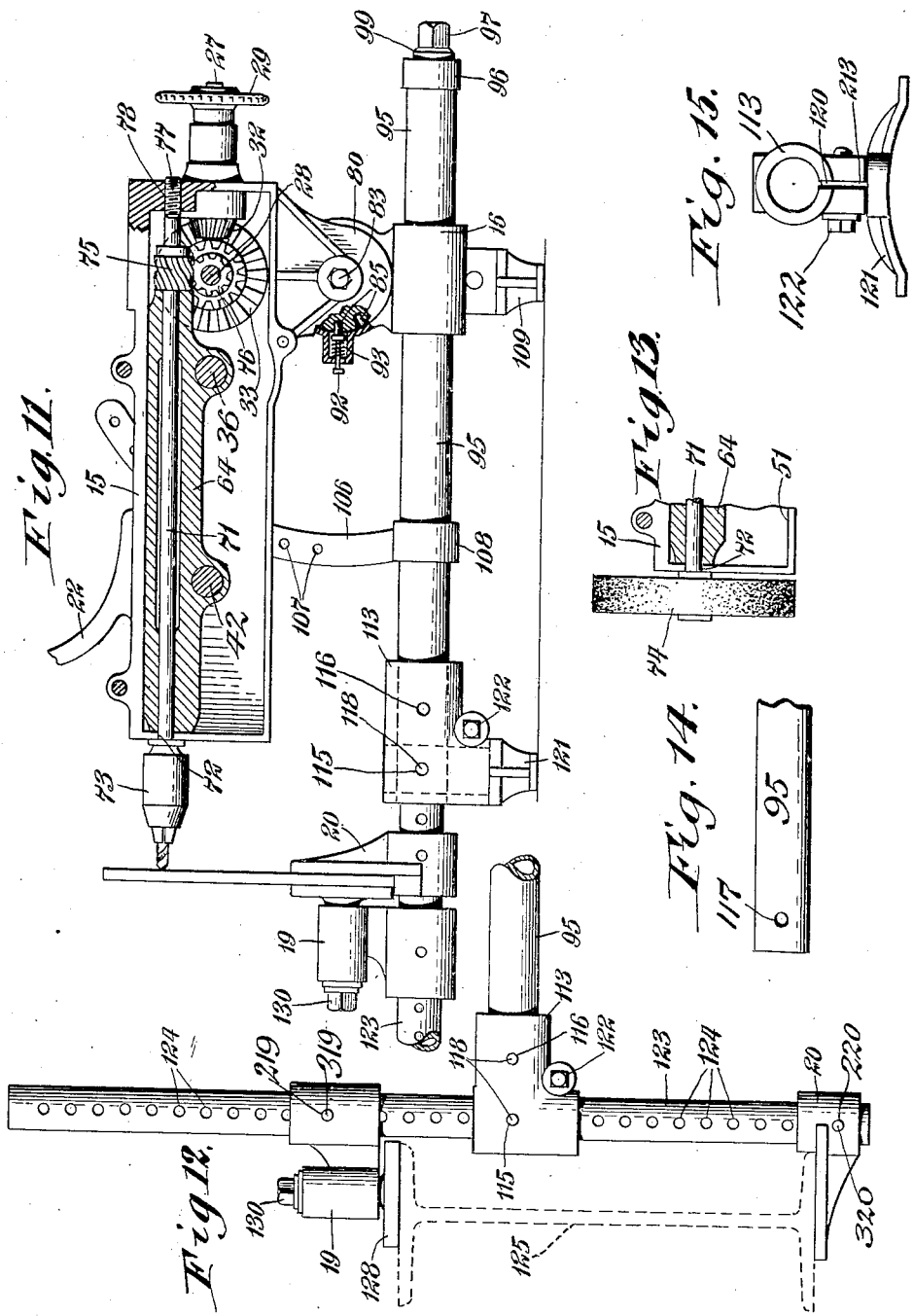

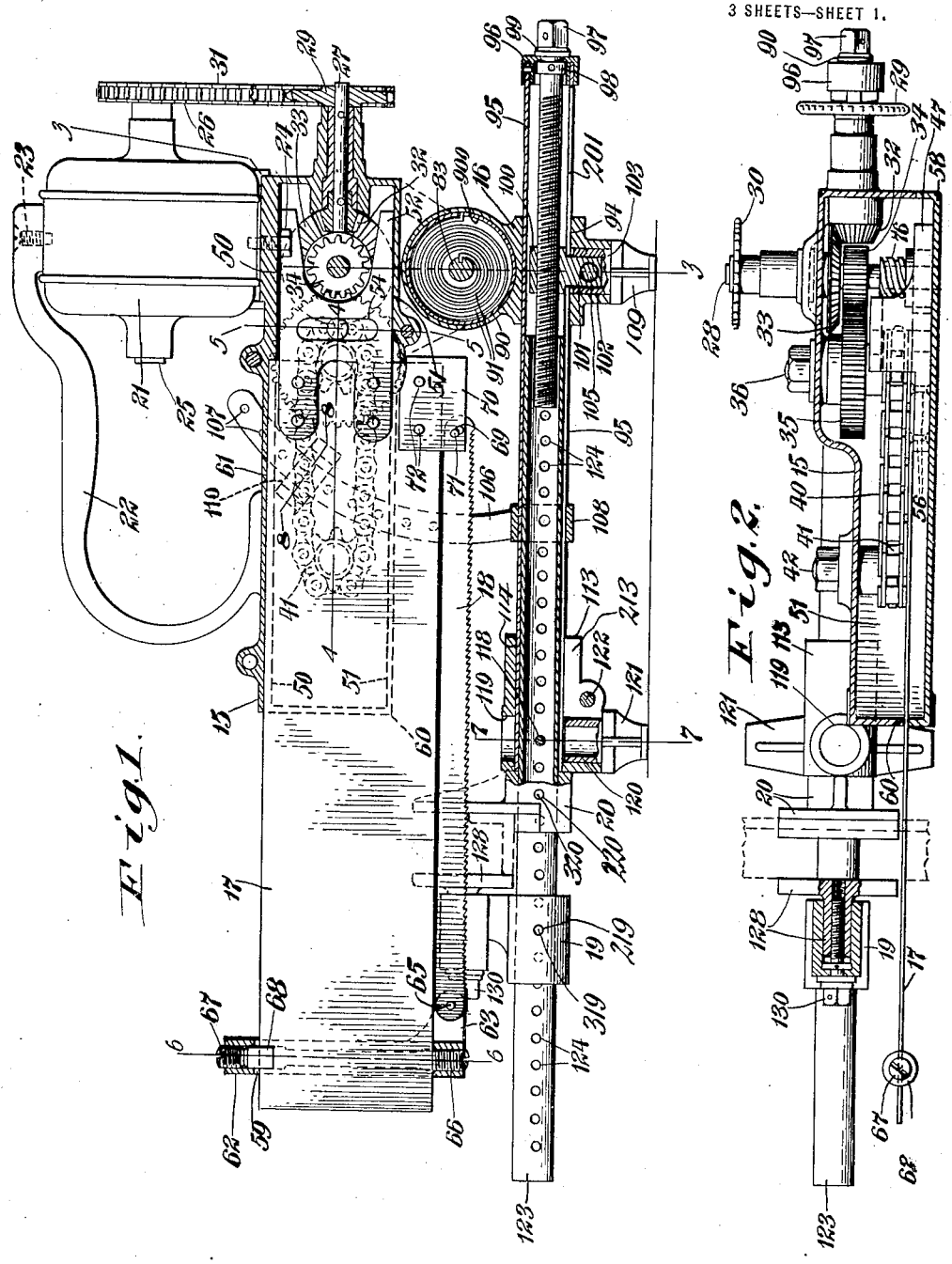

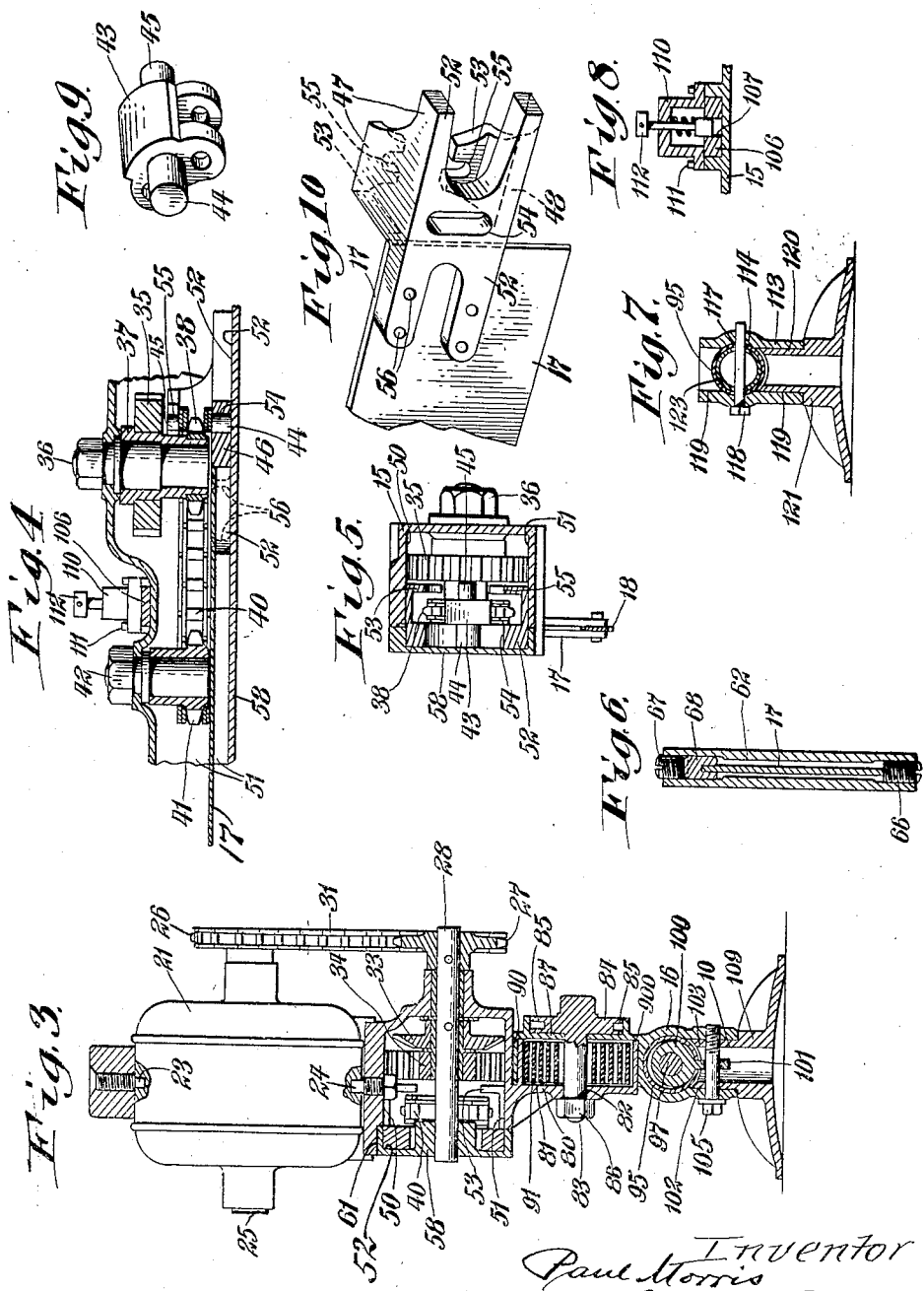

UNITED STATES PATENT OFFICE.

PAUL MORRIS, OF BUFFALO, NEW YORK.

MACHINE FOR SAWING, DRILLING, GRINDING, &c.

1,337,147.  Specification of Letters Patent.  Patented Apr. 13, 1920.

Application filed April 14, 1919. Serial No. 289,897.

*To all whom it may concern:*

Be it known that I, PAUL MORRIS, a citizen of the United States, residing at Buffalo, in the county of Erie and State of New York, have invented new and useful Improvements in Machines for Sawing, Drilling, Grinding, &c., of which the following is a specification.

This invention relates to that class of small, stationary or portable, motor-driven machines which may, as the occasion requires, be employed for either sawing, drilling, grinding or for other similar purposes, such as the coarse machine work which is done directly on the job in structural steel work and ship building, or where any kind of cold saw cutting is required.

The purpose of this invention is more particularly to provide an electric driven, power saw which can effect a saw cut of any desired depth, and with just the proper pressure exerted on the back of the saw blade, irrespective of whether the saw is arranged horizontally, vertically, upside down, or in any other position.

A further object is to provide a power saw which will have a uniform cutting-stroke speed, so that the maximum of cutting efficiency may be obtained.

A still further object is to provide either a portable or a stationary machine which will handle work varying considerably in shape and size and which can be converted readily into saw, drill press, power grinder, or other like purpose, so that the one machine can execute a wide range of work.

In the accompanying drawings:

Figure 1 is a side elevation, partly in section, showing the machine used as a power saw operated at low speed. Fig. 2 is a top plan thereof, partly in section. Fig. 3 is a vertical transverse section taken on line 3—3, Fig. 1, but showing the power saw operated at high speed. Fig. 4 is a fragmentary horizontal section taken on line 4—4, Fig. 1. Figs. 5, 6 and 7 are vertical sections taken on the correspondingly numbered lines of Fig. 1. Fig. 8 is a fragmentary horizontal section taken on line 8—8, Fig. 1. Fig. 9 is a perspective of the special link in the belt chain which reciprocates the saw. Fig. 10 is a fragmentary perspective of the thin backing blade with its cross head. Fig. 11 is a fragmentary side elevation of the machine, partly in section, showing the same used as a drill press. Fig. 12 is a detached side elevation of the vise members showing the method of clamping the machine to a deep I-beam. Fig. 13 is a fragmentary side view, partly in section, showing how the machine is adapted for grinding or buffing work. Fig. 14 is a fragmentary side elevation of the rear supporting tube. Fig. 15 is an end elevation of the front supporting base.

Similar characters of reference indicate corresponding parts throughout the several views.

In its general organization, this improved portable machine comprises a main frame 15 pivotally mounted upon a rear supporting base 16 and carrying a wide, very thin backing blade 17, which is caused to reciprocate back and forth on said main frame 15 and has attached to its lower edge the hack saw blade 18. The work piece being sawed is gripped between vise jaws 19 and 20 which are connected to the pivot base 16 by means of telescopic tubing. Two speeds are obtainable by rotating the pivotally mounted electric motor 21 a quarter turn and driving either of the driven shafts 27 or 28. When it is desired to use the machine as a drill press or a grinding or buffing machine, then certain of the mechanism is removed and other parts substituted, as shown in Fig. 11.

The main frame 15 of the machine is of a box-shaped character, so as to provide a dust proof inclosure for the principal working parts of the machine, and is provided on its upper part with an upwardly and rearwardly extending, operating handle-grip 22, and between the lower face of said grip and the upper face of the frame proper is pivotally mounted on vertical pivots 23 and 24 the electric motor 21 or other suitable source of power, and said motor is thereby capable of rotation on a vertical axis relatively to the main frame. The motor is provided with a horizontal, driving shaft 25 to the outer end of which is secured a driving belt chain sprocket wheel 26. Journaled in the main frame 15 is the longitudinal low-speed driven shaft 27 and also the transversely-disposed high-speed driven shaft 28, and to the outer ends of said driven shafts are secured the driven belt-chain sprockets 29 and 30, respectively. A belt chain 31 is provided which passes with its upper turn around the driving sprocket 26 of the motor and whose lower turn may either be passed around the driven sprocket 29, as shown in Fig. 1, or around the driven sprocket 30, as shown in Fig. 2. This is accomplished by removing the lower turn of the chain belt from the particular driven sprocket which it then embraces, and then giving the electric motor a quarter turn and replacing the lower turn of the belt chain on the other sprocket. Manifestly, a set of gears may if desired, be substituted for the chain and sprocket arrangement which is shown in the drawings. To the inner end of the low speed driven shaft 27 is secured a bevel pinion 32, as best seen in Fig. 2, and to the inner end of the high speed driven shaft 28 is secured a bevel gear 33, which is always in mesh with the bevel pinion 32. Thus the high speed driven shaft 28 may be driven at either of two speeds depending on whether the belt chain 31 is passed around sprocket 29 or sprocket 30. A transmission spur pinion 34 is also secured to the high speed shaft 28 inside of the bevel gear 33 and this transmission pinion meshes with a supplemental spur gear 35 which is rotatably mounted on a transversely-arranged stud bolt 36 set into the rear wall of the main frame. This supplemental gear 35 is press fitted onto a bushing or sleeve 37 or otherwise secured thereto, and to this same bushing, preferably is similarly secured a cross-head driving sprocket wheel 38 as shown in Fig. 5. A cross-head belt chain 40 disposed horizontally and longitudinally of the machine, engages one of its turns with the sprocket 38. The other or outer end of said cross head chain-belt is adapted to pass around an idler sprocket wheel 41 which is rotatably and detachably mounted on a stud bolt 42 set into the rear wall of the main frame of the machine. One of the links of this chain belt is a special link 43, as best shown in Figs. 5 and 9, the same being provided with two oppositely-projecting lateral lugs or studs 44 and 45, the former being preferably somewhat larger in diameter than the latter.

Arranged to slide lengthwise back and forth in the main frame 15 and to be suitably guided therein, is an H-shaped cross head 46, best shown in Fig. 10, which head is provided with upper and lower flat longitudinal guide faces 47 and 48, respectively, which are adapted to engage with top and bottom inner flat guide walls 50 and 51, respectively, of the main frame of the machine. The outer side of the cross head is a continuous vertical wall 52 which connects the upper and lower portions of the cross head while the rear wall of the cross head is made up of two inwardly-projecting wall sections 53, 53, which straddle the hubs of the cross head sprocket wheels 38, 41 during the longitudinal movement of the cross-head. As the cross head reciprocates back and forth, the same is constantly in engagement with the special link 43 of the chain belt 40 and this is accomplished by forming in the walls 52 of said cross head an upright thrust slot 54 which is adapted to engage continuously with the large stud 44 of the special link. Formed in the inner wall section 53 of said cross head are two fragmentary thrust notches or slots 55, which are formed vertically in the inner edges of said wall sections. These fragmentary thrust slots engage intermittently with the smaller stud 45 of the special belt chain-link 43, but it should be noted that these fragmentary thrust slots 55 are always in engagement at the time when the cross head is being moved by power transmitted thereto from the said special link. This results by reason of the fact that the smaller stud 45 passes from one of the fragmentary thrust slots 53 to the other at the time when the cross head is at one end of its stroke and when it is practically motionless.

To this cross head is secured by rivets 56 or otherwise the thin, broad backing blade 17 which is therefore caused to reciprocate back and forth with said cross head. This backing blade is principally guided by the cross head, but, in addition the same is prevented from buckling sidewardly by being clamped between the main frame 15 and a cover plate 58 which is detachably secured thereto, the main frame being suitably recessed at 60 for this purpose, as shown in Figs. 1 and 2. The upper edge of said recess 60 stops short of the uppermost edge of the main frame and thereby provides a step 61 which serves as an additional guideway to carry part of the upward thrust of the backing blade. Across the outer end of said backing blade is a vertically arranged tubular clamping head 62, which is centrally provided with a thin, vertical slot 59 which allows the backing blade to pass therethrough. The lower part of said clamping head beyond the lower edge of the backing blade is provided with an inwardly extending bifurcated foot 63, between whose prongs is arranged the hack saw blade 18 which is connected thereto by means of a detachable bolt or pin 65. It is desirable that the upper edge of the hack saw blade bear against the lower edge of the backing blade for purposes of support and hence it becomes necessary to change the relative position of the bolt 65 when different sized saw blades are to be employed. For this reason, the lower part of the clamping head is provided with an internal screw thread which is adapted to receive a lower adjusting screw 66, which bears with its upper end against the lower edge of the backing blade. Thus by screwing this screw in or out, the bolt 65 is moved toward or away from the backing blade. The upper end of the clamping head 62 is likewise provided with an internal screw thread in which is arranged an upper clamping screw 67, and preferably a clamping block 68 is interposed between the lower face of said upper clamping screw and the upper edge of the backing blade which is preferably bifurcated at its lower end so as to straddle the backing blade and be thereby constrained against rotation. The inner end of the saw blade is arranged between a pair of flat retaining blocks 70 which are secured to the backing blade by rivets 72 or otherwise and detachably connected with the rear or inner end of the saw blade by a bolt 71. For the purpose of automatically accommodating hack-saw blades of differing widths and lengths, it is preferable to provide the retaining blocks 70 with an inclined slot 69, so that when the clamping head 62 is loosened and the saw blade moved outwardly or forwardly, the detachable retaining bolt 71 will be caused to move upwardly until the saw blade has come into contact with the lower edge of the backing blade.

When it is desired to convert the machine into a drill press, grinding or buffing machine or the like, the cover plate 58 of the main frame is first taken off and then the two sprocket wheels 38 and 41 are removed, together with the crosshead, spur gear 35 and the backing blade 17, together with its appurtenances. Then a bearing block 64 is slipped over the two permanent frame stud bolts 36 and 42 and the cover plate 58 again bolted in place as before. In this bearing block is suitably journaled a longitudinal operating shaft 71 which is adapted to project through a suitable accommodating notch or recess 72 formed in the front or outer end wall of the main frame. The front or outer end of this operating shaft is provided with an external screw thread so that either a drill chuck 73 may be mounted on the end of said shaft, as shown in Fig. 11, or if desired an emery wheel 74 may be substituted, as shown in Fig. 13, or any other desirable rotatable working head such as a buffing wheel, rotary saw, facing tool or the like may be employed. To the opposite rear or inner end of this operating shaft 71 is secured preferably a driven spiral gear 75 which meshes with and is driven by a driving spiral gear 76 secured to the inner end of the high speed, driven shaft 28. This driving spiral gear 76 need not be removed when the machine is to be used for sawing or other purposes, as is shown in Fig. 2. For adjusting the thrust of the operating shaft at the inner end thereof, a thrust bolt 77 is provided which is axially in line with said shaft and is screw threaded into a tapped hole 78 arranged in the inner or rear end wall of the main frame of the machine. Formed on the lower inner end of the main frame is a depending spring housing or disk shaped pivot plate 80 whose flat inner vertical face 81 extends longitudinally of the machine and whose center is pierced by a transversely-extending pivot bearing 82. Arranged in said bearing is a pivot bolt 83 upon the rear end of which is formed a large circular head 84 which is provided annularly with a number of adjusting apertures 85 extending radially inwardly from its periphery, while the forward end of said bolt is provided with a screw nut 86, which bears against the outer face of the pivot plate 80 and retains said bolt in place. Journaled on the rear end of said pivot bolt 83 is a disk-shaped backing-wall 87 which forms a part of the pivot base 16 aforesaid and whose inner flat face is parallel to the pivot plate 80 and transverse to the pivot bolt 83. An annular flange 90 is formed around the rim of the circular backing wall 87 extending forwardly therefrom and incased within said flange is a coiled, spiral clock spring 91. This spring is secured at its outer end to the annular flange 90 of the spring housing 80 while its inner end is secured to the pivot bolt 83, as shown in Fig. 1, so that the tendency of the spring is to move the main frame 15 of the machine relatively to the pivot base 16 about the pivot bolt 83 as an axis. To adjust the tension of this spring when various kinds of metal are to be worked upon or when the whole machine is supported in different positions or when different toothed saw blades are employed, arrangement is made for adjustably turning the pivot bolt 83 relatively to the pivot base. This is accomplished by providing an adjusting locking dog 92 radially and slidably arranged on one side of the annular flange 90 and yieldingly pressed inwardly by a helical spring 93. This locking dog 92 is adapted to engage with any desired one of the adjusting apertures 85 aforesaid, so that for adjustment of the spiral spring to get the required tension upon the saw, it is merely necessary to pull out the said dog, turn the pivot bolt 83 to the proper position and then allow the dog to snap into the adjacent apertures 85.

The lower part of the pivot base 16 is provided with a hollow cylindrical bearing surface 94 extending longitudinally of the machine and arranged to receive a rear supporting tube 95 longitudinally slidable therein. Secured to the rear end of this supporting tube is a cap or head 96 in which is journaled a longitudinally extending adjusting screw 97 which is prevented from moving longitudinally relatively to said supporting tube by reason of collars 98 and 99 arranged on said screw and engaging with opposite sides of the cap 96. The inner end of said adjusting screw 97 is provided with an external screw thread which is adapted to engage with a tapped hole arranged in a thrust nut 100. This nut is prevented from moving longitudinally by reason of a depending fin 101 thereon which engages with a longitudinal slot 201 in the tube 95. Thus as the adjusting screw 97 is turned in the thrust nut 100, the supporting tube 95 is moved longitudinally relatively to the pivot base 87. Formed in the lower part of the clamping base is a vertically disposed cylindrical clamping aperture 102 and arranged to fit therein is an upwardly-extending tubular stud 103. This lug is formed on the upper end of a rear or inner pedestal foot 109 provided with laterally extending toes which serve to stably support the whole machine when the same is resting on a flat surface such as the top of a work bench. Formed centrally in the inner pedestal foot 109 is a vertical cylindrical restraining hole 104 which is arranged to receive the depending pin 101 of the thrust nut 100 and thereby restrain said nut against longitudinal movement as aforesaid. Passing transversely through suitable holes or slots in the pivot base, the inner pedestal foot and the depending fin of the thrust nut, is an inner clamping bolt 105, which, when tightened, clamps said inner pedestal foot to the pivot base.

Arranged against the rear face of the main frame 15 of the machine is an arcuate or curved locking arm 106 which is provided with a plurality of locking holes 107 arranged along the upper part thereof, while the lower part of the same is provided with a sleeve or sliding hub 108 in which the supporting tube 95 slides back and forth as the adjusting screw 97 is turned. Straddling the upper part of the locking arm is a locking cleat 110 which is secured by screws 111 to the main frame 15 of the machine and in the central part of which is slidably mounted a spring depressed locking dog 112 adapted to engage with any desired one of the locking holes 107 of the locking arm. Thus when it is desired to raise the main frame 15 of the machine at an angle relatively to the base thereof and hold it in its raised position while the work piece or parts of the machine are being adjusted, the locking dog 112 is pulled outwardly, the frame raised, and then said dog allowed to snap back into an adjacent locking hole 107.

Arranged at the end of the supporting tube 95 and opposite to the cap 96 thereof is a front supporting base 113 which is provided with a hollow cylindrical bearing surface 114 wherein the supporting tube is fitted. To prevent said supporting base from sliding on the supporting tube, the base is provided with two transverse placing holes 115 and 116 either of which may be caused to register with a transverse locating hole 117 arranged in the end of the supporting tube 95, and a pin 118 is adapted to be passed through the desired holes, so as to locate the front supporting base on the supporting tube either as shown in Figs. 1 and 11, or as shown in Fig. 12. This supporting base 113 is also provided with a transverse clamping opening 119 of uniform bore and passing entirely through the base vertically. Adapted to project upwardly into the lower part of this clamping hole is a round hub 120 which is formed at the upper end of a front pedestal foot 121 similar to the rear pedestal foot 109. Passing horizontally and transversely through the front supporting base 113 is a clamping bolt 122 which, when tightened up, causes this base to pinch or clamp both the hub 120 of the front pedestal foot and also the supporting tube to said base by contracting the latter which is preferably provided with a longitudinal split 213 to permit of this action.

Adapted to be variously positioned longitudinally in the bore of the hollow supporting tube 95 is an extension tube 123 which is pierced by a plurality of transverse adjusting holes 124 extending its entire length. Any one of these adjusting holes may be moved into line with both the holes 115, 116 and to be used to simultaneously prevent relative movement of the extension tube, the supporting tube and the front supporting base. For some special work such as cutting a deeply webbed steel beam 125, as shown in Fig. 12, the extension tube 123 and also the front pedestal foot 121 may be removed from the front supporting base, then the pin 118 may be passed through the rear hole 116 of the front supporting base and one hole 117 of the supporting tube and the extension tube is then slipped vertically through the vertical opening 119 in the front supporting base and another round pin 118 is passed through the front hole 115 of the front supporting base and through one of the holes in said extension tube. Slidably mounted on the extension tube are the two vise jaws 19 and 20 whose hubs are transversely pierced by suitable holes 219, 220 for the reception of pins 319, 320, so that the vise jaws may be placed at any desired point on the extension tube and pinned in place. The jaws may be both placed on the one side of the front supporting base, as shown in Figs. 1 and 11, or on either side, as shown in Fig. 12, depending on the nature of the work to be executed. In the case of Fig. 12, for instance, the entire machine is clamped to the I-beam work piece, showing how the whole machine which is light in weight may be taken to the heavy beam to be cut rather than to transport the beam to where the machine is located. So as to tightly clamp the work piece between the vise jaws, the one jaw 19 is provided with a longitudinally slidable jaw plate 128 which can be moved forwardly or backwardly by means of a vise screw 130 journaled in the body of the vise jaw and screw threaded into the plate 128 thereof, as shown in Figs. 2 and 12.

It will be noted that in a broad sense this machine consists of a supporting bench formed essentially by the telescopic tubes, pedestal feet and associated parts, a work piece holder consisting primarily of the clamping jaws which are adjustably mounted on the bench, and means movably mounted on the bench for actuating a working tool such as a saw whereby the work piece is operated upon.

In operation, the machine is first equipped with the proper cutting device, which is either the reciprocating saw apparatus or one of the various kinds of rotary apparatus. This is accomplished by unbolting the cover plate 58, inserting the necessary parts into the box-shaped portion of the main frame 15 and then replacing said cover. The motor chain belt 31 may then, if desired, be removed and the motor 21 given a quarter turn so that its driving shaft 25 will be arranged either parallel to or transversely of the machine for obtaining the proper cutting speed. Then the main frame is swung up and held in its raised position by the arcuate locking arm 106 and the work is then properly clamped between the vise jaws 19 and 20 in either of the manners shown. The frame is then lowered and the motor started. If the machine is doing saw work, the pressure of the saw on the work may be altered by adjusting the tension of the spring 91, whereas if the machine is doing drill work, for instance, the work is fed against the drill 73 by means of the adjusting screw 97.

Many advantages of this improved portable machine will be apparent. Its portability allows it to be carried directly to the work which is to be operated upon. It can be clamped to the work piece in all sorts of positions and it can be used as a bench tool as well. Sawing can be properly executed even when the saw is reciprocated vertically, because the tension of the spring 91 is unaffected by gravity. Saw cuts of a considerable depth can be made, because the backing blade 17 to which the saw blade is attached is thinner than the saw blade itself and follows right behind it in the cut. Very little pressure is put upon this backing blade, because when the saw is effecting its cutting stroke, which is in an inward direction, the saw blade is under tension, and therefore is not liable to buckle up or become distorted. The machine is readily adapted to execute the required work at either of two cutting speeds. When used as a saw or drilling machine, the cutting of the material is done at a constant speed during the entire operation of the tool. Saws of different lengths and widths are readily accommodated. And, finally, the machine is simple in construction, reliable and powerful in performance, capable of a large variety of work and it can be manufactured at low cost.

I claim as my invention:

1. A machine of the character described, comprising a frame, a reciprocatory cross head adapted to slide thereon, a saw blade, and a backing blade at least as thin as said saw blade and adapted to be secured to said cross head, said saw blade being arranged lengthwise of one edge of said backing blade and attached with its ends thereto.

2. A machine of the character described comprising a reciprocable tool, an endless belt, and means for connecting said belt and tool comprising a carrier connected with said tool and provided with a way arranged transversely to the length of said belt and a pin carried by the belt and engaging movably with said way.

3. A machine of the character described, comprising a frame, a high speed driven shaft, a low speed driven shaft, a driving shaft, means for driving either the high speed or the low speed driven shaft from the driving shaft, a saw blade reciprocating on said frame, and an operating shaft for said blade adapted to be driven from said driving shaft through the medium of said low and high speed shafts.

4. A machine of the character described, comprising a frame, a high speed driven shaft, and a low speed driven shaft geared together and rotatably mounted in said frame perpendicularly to each other, a driving shaft shiftable on said frame so that its axis is parallel with one or the other of said driven shafts and capable of being connected with either of the same, a source of power connected to said driving shaft, and a cutting device connected with said driven shafts.

5. A machine of the character described, comprising a frame, two driven shafts journaled in said frame and geared together and arranged at right angles to each other, a motor mounted on said frame so as to turn on a vertical axis and provided with a driving shaft which may be operatively connected with either of said driven shafts, a gear pinion on one of said driven shafts, a gear wheel meshing with said pinion, a cross head sliding on said frame and provided with a slot, a belt driven by said gear wheel and provided with a link engaging said slot, and a cutting device connected with said cross head.

6. A machine of the character described, comprising a frame, a cross head slidably mounted on said frame and provided on one side with a long transverse slot and on its opposite side with a short slot, a belt arranged on said frame with its upper and lower stretches parallel with the movement of the cross head and provided with a link having a pin engaging continuously with said long slot and intermittently with said short slot, a cutting device connected to said cross head, and means for driving said belt.

7. A machine of the character described, comprising a frame, two driven shafts journaled in said frame and arranged at right angles to each other and geared together, a motor having a driving shaft and pivotally mounted on said frame on an axis perpendicular to both of said driven shafts, means for operatively connecting said driving shaft with either of said driven shafts, and a cutting device mounted on said frame and adapted to be driven by one of said driven shafts.

8. A machine of the character described, comprising a frame, a cross head sliding on said frame and provided on one side with a long transverse thrust slot and on the other side with short upper and lower slots separated by a gap, sprocket wheels journaled on said frame having hubs in line with said gap in the cross head, a belt passing around said sprocket wheels and provided with a link which continuously engages said long slot and intermittently engages with said short slots, a cutting device connected with said cross head, and means for driving one of said sprocket wheels.

9. A machine of the character described, comprising a frame, a cross head sliding on said frame, a backing blade secured to said cross head, a saw blade at least as thick as said backing blade and arranged along one edge of the same, and a clamping head straddling said backing blade and clamping said saw blade thereto.

10. A machine of the character described, comprising a frame, a cross head sliding on said frame, a backing blade secured to said cross head, a slotted clamping head which receives said backing blade and is clamped thereto, and a saw blade arranged along one edge of said backing blade and detachably secured thereto.

11. A machine of the character described, comprising a frame, a cross head sliding thereon, a backing blade secured to said cross head, a clamping head which receives said backing blade, screws mounted on opposite ends of said head, and a saw blade secured to said clamping head between said screws.

12. A machine of the character described, comprising a frame, a base, a saw blade mounted on said frame and reciprocating relatively thereto, and a yieldable connection between said base and said frame capable of being set to move said frame either toward or away from said base.

13. A machine of the character described, comprising a supporting base, a frame pivotally mounted on said base, a saw blade reciprocating on said frame, and an adjustable yielding connection between said frame and said base capable of being set to move said frame either toward or away from said base.

14. A machine of the character described, comprising a frame, a base, a pin connecting said base with said frame, a cross head sliding on said frame, a saw blade connected to said cross head, and a spring connecting said frame and said pin.

15. A machine of the character described, comprising a frame, a base, a cross head sliding on said frame, a saw blade connected with said cross head, a pin pivotally connecting said frame and base, and adjusting means for retaining said frame in different positions relatively to said base.

16. A machine of the character described, comprising a base, a frame pivoted to said base, an arcuate locking arm adjustable relatively to said frame and provided with a sliding hub, a supporting tube longitudinally slidable in said base and also in the hub of the arcuate locking arm, and a cutting device mounted on said frame.

17. A machine of the character described, comprising a base, a frame connected therewith, a supporting tube slidably connected with said base, a telescoping extension tube sliding in said base, a vise mounted on said extension tube and adapted to hold the work piece, and a cutting device mounted on the frame and adapted to operate on the work piece held by the vise.

18. A machine of the character described, comprising a frame, a supporting tube connected with said frame and longitudinally slidable relatively thereto, an extension tube mounted on said supporting tube and slidable relatively to said supporting tube and adapted to hold the work piece, vise jaws adjustable on said extension tube, and a cutting device mounted on said frame and adapted to operate on the work piece held by the vise.

19. A machine of the character described, comprising a frame, a suporting tube connected with said frame and longitudinally slidable relatively thereto, a supporting base, an extension tube arranged at right angles to said supporting tube, a clamping bolt passing through said supporting base and securing thereto said supporting tube and said extension tube, and a cutting device mounted on said frame.

20. A machine of the character described, comprising a frame, a cutting device movably mounted thereon, a supporting base connected with said frame, a tube operatively connected with said base, a pedestal foot, and a clamping bolt for connecting said base with said tube and said pedestal foot.

21. A machine of the character described, comprising a frame, a cutting device mounted on said frame, a base, a supporting tube, a pedestal foot, and a clamping bolt for simultaneously connecting said base with said pedestal foot and said supporting tube.

22. A machine of the character described, comprising a frame, a cutting device movably mounted on said frame, a base, a supporting tube slidable in said base, a thrust nut provided with an internal thread and connected with said base, and an adjusting screw movable lengthwise in said supporting tube and engaging with the thread of said thrust nut.

23. A machine of the character described, comprising a frame, a cutting device movably mounted on said frame, a base pivotally connected with said frame, a supporting tube slidable in said base, a pedestal foot, a thrust nut, a clamping bolt passing through said base and said thrust nut and said pedestal foot, and an adjusting screw connected with said supporting tube and passing through said thrust nut.

24. A machine of the character described, comprising a frame, a cutting device movably mounted on said frame, a base provided with a clamping aperture, a pedestal foot extending into said aperture and provided with a restraining hole, a thrust nut extending into said restraining hole, and an adjusting screw passing through said thrust nut.

25. A machine of the character described, comprising a frame, a cutting device movably mounted on said frame, a rear supporting base, a supporting tube connected with said rear supporting base, a front supporting base, an extension tube, and a locking pin associated with said front supporting base, said supporting tube, and said extension tube.

26. A machine of the character described, comprising a frame, a cutting device movably mounted on said frame, a supporting tube connected with said frame, a supporting base secured to said supporting tube, and an extension tube adapted to be either arranged longitudinally in said supporting tube or transversely in said base.

27. A machine of the character described, comprising a frame, a cutting device movably mounted on said frame, a supporting tube connected with said frame, a base arranged on said supporting tube and provided with a transverse clamping hole passing entirely through said clamping head, an extension tube which may be arranged either in one end of said supporting tube or in the clamping hole of said base, and a pair of vise jaws adjustably mounted on said extension tube.

28. A machine of the character described, comprising a frame, a cutting device movably mounted on said frame, a base, a supporting tube adjustable longitudinally on said base, a supporting base arranged on said supporting tube and provided with a transverse clamping hole, an extension tube adapted to either be arranged transversely in said clamping hole or longitudinally in said supporting tube, and means for clamping all of said members together.

PAUL MORRIS.